(12) United States Patent
Song et al.

(10) Patent No.: US 11,953,856 B2
(45) Date of Patent: Apr. 9, 2024

(54) HOLOGRAPHIC DISPLAY APPARATUS

(71) Applicant: SAMSUNG ELECTRONICS CO., LTD., Suwon-si (KR)

(72) Inventors: Hoon Song, Yongin-si (KR); Dukho Lee, Seoul (KR); Jong-Young Hong, Suwon-si (KR); Hongseok Lee, Seoul (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 527 days.

(21) Appl. No.: 17/165,548

(22) Filed: Feb. 2, 2021

(65) Prior Publication Data
US 2021/0373493 A1 Dec. 2, 2021

(30) Foreign Application Priority Data

May 28, 2020 (KR) .................. 10-2020-0064613

(51) Int. Cl.
*G06F 3/01* (2006.01)
*G03H 1/22* (2006.01)
*G06T 7/50* (2017.01)

(52) U.S. Cl.
CPC ......... *G03H 1/2294* (2013.01); *G03H 1/2205* (2013.01); *G06T 7/50* (2017.01); *G03H 2223/23* (2013.01); *G03H 2223/50* (2013.01); *G06F 3/013* (2013.01)

(58) Field of Classification Search
CPC ............... G03H 1/2294; G03H 1/2205; G03H 2223/23; G03H 2223/50; G03H 1/0808; G03H 1/265; G03H 2001/2236; G03H 2001/2292; G03H 2210/454; G03H 2226/05; G03H 1/26; G06T 7/50;
(Continued)

(56) References Cited

U.S. PATENT DOCUMENTS

| 4,830,442 A | 5/1989 | Moss |
| 5,576,887 A | 11/1996 | Ferrin et al. |
| 5,661,577 A * | 8/1997 | Jenkins ............... G11B 7/28 |

(Continued)

FOREIGN PATENT DOCUMENTS

| JP | 2014-102276 A | 6/2014 |
| KR | 10-2012-0095212 A | 8/2012 |

(Continued)

OTHER PUBLICATIONS

Lim et al., "360-degree tabletop electronic holographic display," Optics Express vol. 24, No. 22, Oct. 2016, Total 11 pages.

*Primary Examiner* — Vijay Shankar
(74) *Attorney, Agent, or Firm* — Sughrue Mion, PLLC

(57) ABSTRACT

Provided is a holographic display apparatus including: a spatial light modulator that modulates a wavefront of a reference beam to form a hologram image; an optical element arranged to change a position of a viewing window of the hologram image off-axis by a first angle; and an image processor that generates hologram data according to the position of the viewing window of the hologram image and a hologram image to be reproduced, and provides the hologram data to the spatial light modulator. The hologram image formed by the spatial light modulator is viewable from a side of the spatial light modulator.

20 Claims, 17 Drawing Sheets

(58) Field of Classification Search
CPC ....... G06F 3/013; G02B 27/425; G02B 30/56; G02F 1/292
See application file for complete search history.

(56) References Cited

U.S. PATENT DOCUMENTS

| | | | |
|---|---|---|---|
| 6,449,090 B1 | 9/2002 | Omar et al. | |
| 9,459,155 B2 * | 10/2016 | Okamoto | G01J 9/0215 |
| 10,884,240 B2 | 1/2021 | Song et al. | |
| 2003/0151785 A1 * | 8/2003 | Vertoprakhov | G01S 7/4811 |
| | | | 359/15 |
| 2004/0004746 A1 * | 1/2004 | Riza | G02B 26/106 |
| | | | 359/204.1 |
| 2015/0253197 A1 * | 9/2015 | Okamoto | H04B 10/0795 |
| | | | 398/28 |
| 2016/0216691 A1 | 7/2016 | Kim et al. | |
| 2020/0050145 A1 | 2/2020 | Kim et al. | |
| 2021/0364987 A1 * | 11/2021 | Li | G02B 27/283 |

FOREIGN PATENT DOCUMENTS

| | | |
|---|---|---|
| KR | 10-2016-0092716 A | 8/2016 |
| KR | 10-2020-0004579 A | 1/2020 |
| KR | 10-2020-0018180 A | 2/2020 |

* cited by examiner

HOLOGRAPHIC DISPLAY APPARATUS

CROSS-REFERENCE TO RELATED APPLICATION

This application is based on and claims the benefit of priority to Korean Patent Application No. 10-2020-0064613, filed on May 28, 2020, in the Korean Intellectual Property Office, the disclosure of which is incorporated herein in its entirety by reference.

BACKGROUND

1. Field

The disclosure relates to a holographic display apparatus, and more particularly, to a holographic display apparatus that may be viewed from a position away from the front of a panel.

2. Description of the Related Art

As three-dimensional image display methods capable of making the depth perceived by the brain consistent with the focus of the eyes and providing full parallax, holographic display techniques have been considered. According to a holographic display technique, when reference light is irradiated onto a holographic pattern having recorded thereon an interference pattern obtained by interference between object light reflected from an original object and the reference light, the reference light is diffracted and an image of the original object is reproduced. A currently considered holographic display technique provides a computer-generated hologram (CGH) signal, rather than a holographic pattern obtained by directly exposing an original object to light, as an electric signal to a spatial light modulator (SLM). Then, the spatial light modulator forms a holographic pattern and diffracts reference light according to the input CGH signal, thereby generating a three-dimensional image.

On the other hand, because currently commercially available spatial light modulators are not small enough in terms of pixel size, the size of a viewing window is narrow, and thus a viewer may view a 3D image only from an almost fixed position. In addition, because a reference beam used for a holographic display is incident in the direction perpendicular to the spatial light modulator, a viewer may view a 3D image only in front of the spatial light modulator.

SUMMARY

Provided are holographic display apparatuses that allow a 3D image to be viewed at a side position away from the front of a display panel.

Additional aspects will be set forth in part in the description which follows and, in part, will be apparent from the description, or may be learned by practice of the presented embodiments of the disclosure.

According to an aspect of the disclosure, there is provided a holographic display apparatus comprising: a spatial light modulator configured to modulate a wavefront of a reference beam to form a hologram image; an optical element arranged to bend an incident beam onto at least one of a light incident surface and a light exit surface of the spatial light modulator to change a position of a viewing window of the hologram image off-axis by a first angle; and an image processor configured to generate hologram data according to the position of the viewing window of the hologram image and a hologram image to be reproduced, and provide the hologram data to the spatial light modulator, wherein the hologram image formed by the spatial light modulator is viewable from a side of the spatial light modulator.

The holographic display apparatus may further comprise a condensing lens configured to focus the reference beam on to the spatial light modulator.

The optical element may comprise a diffractive optical element.

The optical element may be located in front of the condensing lens, between the condensing lens and the spatial light modulator, or behind the spatial light modulator.

The optical element may be configured to selectively switch between positioning the viewing window of the hologram image in front of the spatial light modulator or moving the viewing window of the hologram image off-axis by the first angle.

The optical element may comprise one of a polarization grating or a meta-optical element, which are selectively switchable based on the polarization of the reference beam.

The optical element may be located in front of the condensing lens, between the condensing lens and the spatial light modulator, or behind the spatial light modulator.

The optical element may be located in front of the condensing lens, between the condensing lens and the spatial light modulator, or behind the spatial light modulator.

The optical element may comprise an off-axis lens configured to focus and bend the reference beam.

The first angle may be about 30 degrees or more.

The holographic display apparatus may further comprise a beam deflector configured to that fine-adjust the position of the viewing window of the hologram image in the range of a second angle smaller than the first angle.

The second angle may be about 10 degrees or less.

The holographic display apparatus may further comprise a beam deflector configured to that fine-adjust the position of the viewing window of the hologram image in the range of a second angle smaller than the first angle.

The first angle may be about 30 degrees or more, and the second angle may be about 10 degrees or less.

The optical element may be located on a light incident surface of the spatial light modulator, and the image processor may further configured to provide hologram data to the spatial light modulator fora reference beam incident to the spatial light modulator at an angle.

The first angle may be about 30 degrees or more.

The holographic display apparatus may further comprise a beam deflector configured to that fine-adjust the position of the viewing window of the hologram image in the range of a second angle smaller than the first angle.

The first angle may be about 30 degrees or more, and the second angle may be about 10 degrees or less.

The image processor may be further configured to generate the hologram data by: decomposing into a plurality of reproduction planes; imaging of the plurality of reproduction planes with a virtual lens to calculate a position and inclined angle of the imaged planes; and calculation of a computer-generated hologram (CGH) by propagating the imaged planes to the spatial light modulator.

The image processor may be further configured to calculate the position and the inclined angle of the imaged planes by: rotation-transforming a wavefront of one image plane into a plane parallel to the spatial light modulator; propagating the rotation-transformed plane to a center of a first next plane; rotation-transforming the wavefront such that the propagated plane is parallel to the first next plane; replacing the rotation-transformed plane with the first next plane;

rotation-transforming a wavefront of the first next plane in parallel with the spatial light modulator to propagate to a second next plane, and repeating the rotation-transforming and propagating until a last plane is reached, and generating hologram data by calculating the CGH by back-propagating the last plane to the spatial light modulator when reaching the last plane.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
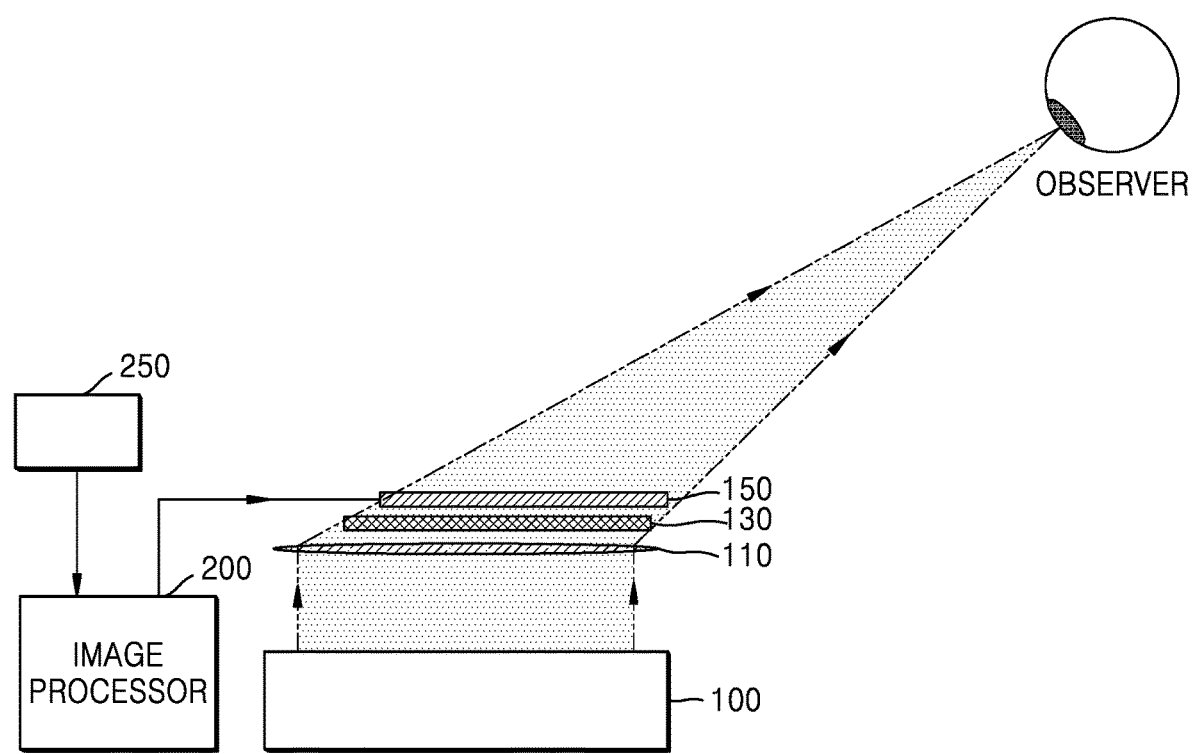
FIG. 1 is a view of a holographic display apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. The same reference numerals refer to the same elements throughout. In the drawings, the sizes of constituent elements may be exaggerated for clarity. The embodiments described below are only examples, and thus, it should be understood that the embodiments may be modified in various forms.

For example, when an element is referred to as being "on" or "above" another element, it may be directly on the other element, or intervening elements may also be present. It will be understood that, although the terms "first", "second", etc. may be used herein to describe various elements, these elements should not be limited by these terms. These terms are used only to differentiate an element from another element. These terms do not limit the material or structure of the components. As used herein, the singular forms "a", "an", and "the" are intended to include the plural forms as well, unless the context clearly indicates otherwise. In addition, it will be understood that when a unit is referred to as "comprising" another element, it does not preclude the possibility that one or more other elements may exist or may be added. The use of the terms "a", "an", and "the" and similar referents is to be construed to cover both the singular and the plural.

In holographic display technology, a reference beam, which is focused by a focus by a condensing lens, is diffracted by a pixel structure of a spatial light modulator, and the diffracted light gathers near the focus to form a viewing window. Because information about a 3D object reproduced by the spatial light modulator is transmitted only to an area inside the viewing window, a holographic display cannot be viewed outside the viewing window. In addition, because the spatial light modulator is not sufficiently small in pixel size, the size of the viewing window may be narrowed to a level of, for example, several mm. Therefore, when a reference beam used for the holographic display is incident in a direction perpendicular to the spatial light modulator, an observer may view a 3D object only in front of the spatial light modulator.

According to a holographic display apparatus according to an embodiment, a new form factor is proposed such that a hologram image may be viewed even in an environment where a display panel is viewed from the side by selectively or non-selectively applying an optical element that bends an incident beam. Because the holographic display apparatus according to the embodiment is applicable to all display apparatuses on which the holographic display is mounted, the holographic display apparatus according to the embodiment may be used for a table top device, a portable device, and the like.

FIG. 1 is a view of a holographic display apparatus according to an embodiment.

Referring to FIG. 1, the holographic display apparatus includes a spatial light modulator 150, an optical element 130 arranged to bend an incident beam onto the spatial light modulator 150, and an image processor 200 that generates a hologram data signal, for example, a computer-generated hologram (CGH) signal, based on source image data containing information about a hologram image to be reproduced. According to an embodiment, the optical element 130 may be arranged to bend an incident beam onto the light incident surface of the spatial light modulator 150. According to another embodiment, the optical element 130 may be arranged to bend light from the light exit surface of the spatial light modulator 150.

The spatial light modulator 150 modulates a wavefront of a reference beam to form a hologram image. The optical element 130 is arranged to bend an incident beam, and changes a viewing window of the hologram image off-axis by a first angle. According to an embodiment, the optical element 130 changes the viewing window of the hologram image off-axis by moving the viewing window of the hologram image off-axis by a first angle. The image processor 200 generates hologram data according to a position of the viewing window of the hologram image and a hologram image to be reproduced, and provides the hologram data to the spatial light modulator 150. The holographic display apparatus according to an embodiment may include a backlight 100 that provides a reference beam, and may further include a condensing lens 110 that focuses the reference beam and provides the reference beam to the spatial light modulator 150. In addition, the holographic display apparatus according to the embodiment may further include an eye tracker 250 that tracks a pupil position of an observer. According to the holographic display apparatus according to this embodiment, a hologram image formed by the spatial light modulator 150 may be viewed from the side.

The backlight 100 is configured to provide collimated coherent reference light, and may include, for example, a light source providing coherent light and a light guide plate, etc. The backlight 100 may include, for example, a laser diode (LD) as a light source. However, when light has a certain degree of spatial coherence, because the light may be diffracted and modulated by the spatial light modulator 150, it is also possible to use, for example, a light-emitting diode (LED) as a light source. In addition to the LED, any other light source may be used as long as it emits light having spatial coherence.

The spatial light modulator 150 may form a hologram pattern by modulating a wavefront of a reference beam incident according to a hologram data signal, for example, a CGH signal, provided from the image processor 200. After the reference beam emitted from the backlight 100 and incident on the spatial light modulator 150 is diffracted by the hologram pattern formed by the spatial light modulator 150, a hologram image having a stereoscopic effect may be reproduced by extinction interference and constructive interference. As such, the spatial light modulator 150 may modulate a wavefront of a collimated coherent reference beam incident from the backlight 100 according to a hologram data signal provided from the image processor 200 to form a hologram image. The spatial light modulator 150 may use any one of a phase modulator capable of performing only phase modulation, an amplitude modulator capable of performing only amplitude modulation, and a complex modulator capable of performing both phase modulation and amplitude modulation.

The condensing lens 110 may include a refracting lens or a flat lens that focuses an incident beam. FIG. 1 and subsequent drawings show that the condensing lens 110 is in the form of a refracting lens, which is shown as an example, and may also include a flat lens as the condensing lens 110.

According to an embodiment, the optical element 130 may be arranged to bend an incident beam onto the light incident surface of the spatial light modulator 150. According to another embodiment, the optical element 130 may be arranged to bend light from the light exit surface of the spatial light modulator 150. The optical element 130 may include a passive diffraction element and may include, for example, a diffraction optical element. In addition, the optical element 130 may include a passive diffraction element, and may include, for example, a polarization grating, a meta-optical element, and the like that selectively bend an incident beam according to polarization of an incident reference beam.

In a case of providing the condensing lens 110 that focuses a reference beam and provides the reference beam to the spatial light modulator 150, the optical element 130 may be located either in front of the condensing lens 110, between the condensing lens 110 and the spatial light modulator 150, or behind the spatial light modulator 150. FIG. 1 illustrates, as an example in which the optical element 130 is located on a light incident surface of the spatial light modulator 150, that the optical element 130 is located between the condensing lens 110 and the spatial light modulator 150. The optical element 130 may be located on a light exit surface of the spatial light modulator 150. The optical element 130 may move a viewing window of a hologram image formed in the spatial light modulator 150 off-axis by a first angle, for example, an angle of about 30 degrees or more, by bending an incident beam. That is, the optical element 130 may move the viewing window of the hologram image formed in the spatial light modulator 150 to the side by the first angle. By providing the optical element 130 as described above, the viewing window that allows a holographic display to be viewed may be moved from the front to the side, so that a holographic display viewable from the side of the display may be implemented.

By providing the optical element 130, it is possible to bend an incident beam at a large angle, for example, 30 degrees or more, to move the viewing window to the side of the holographic display apparatus according to the embodiment.

In order to move the viewing window by bending the incident beam by a first angle such that a hologram image may be viewed from the side of the holographic display according to the embodiment, a diffractive optical element may be provided as the optical element 130 according to an example embodiment. As another example, the optical element 130 may be provided to position the viewing window of the hologram image in front of the spatial light modulator 150 or to move the viewing window of the hologram image off-axis by a first angle according to switching on/off. For example, as the optical element 130, a polarization grating, a meta optical element, and the like may be provided.

Figure 2:
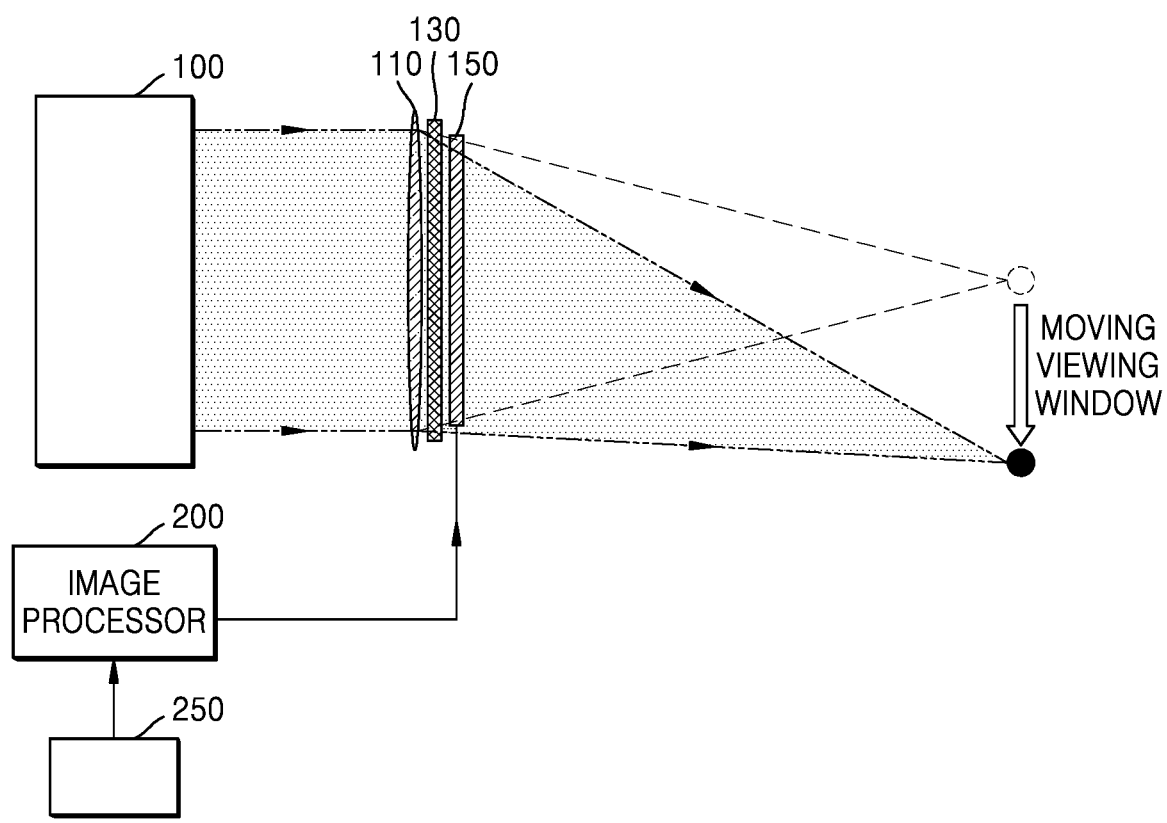
FIG. 2 is a view of movement of a viewing window of a hologram image by an optical element in a holographic display apparatus according to an embodiment.

FIG. 2 shows movement of a viewing window of a hologram image by the optical element 130 in a holographic display apparatus according to an embodiment. Dashed lines in FIG. 2 show that when the optical element 130 is not provided, the viewing window of the hologram image is formed in front of the spatial light modulator 150. A solid line in FIG. 2 shows that the viewing window of the hologram image is moved to the side by bending an incident beam by the optical element 130.

Figure 3:
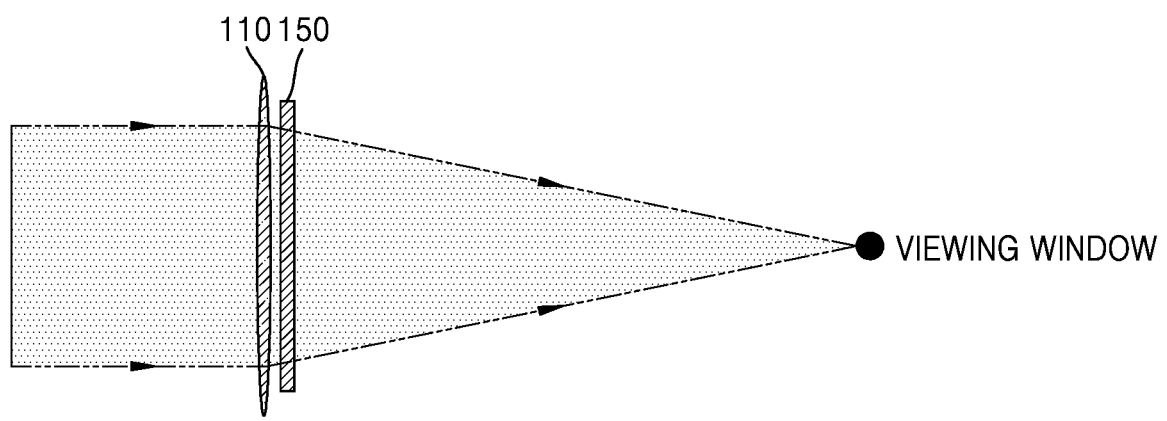
FIG. 3 is a view of a holographic display apparatus according to a comparative example.

FIG. 3 schematically shows a holographic display apparatus according to a comparative example. When the optical element 130 for bending an incident beam is not provided, as shown in FIG. 3, a viewing window of a hologram image is formed in front of the spatial light modulator 150, that is, in front of the holographic display apparatus.

Figure 4:
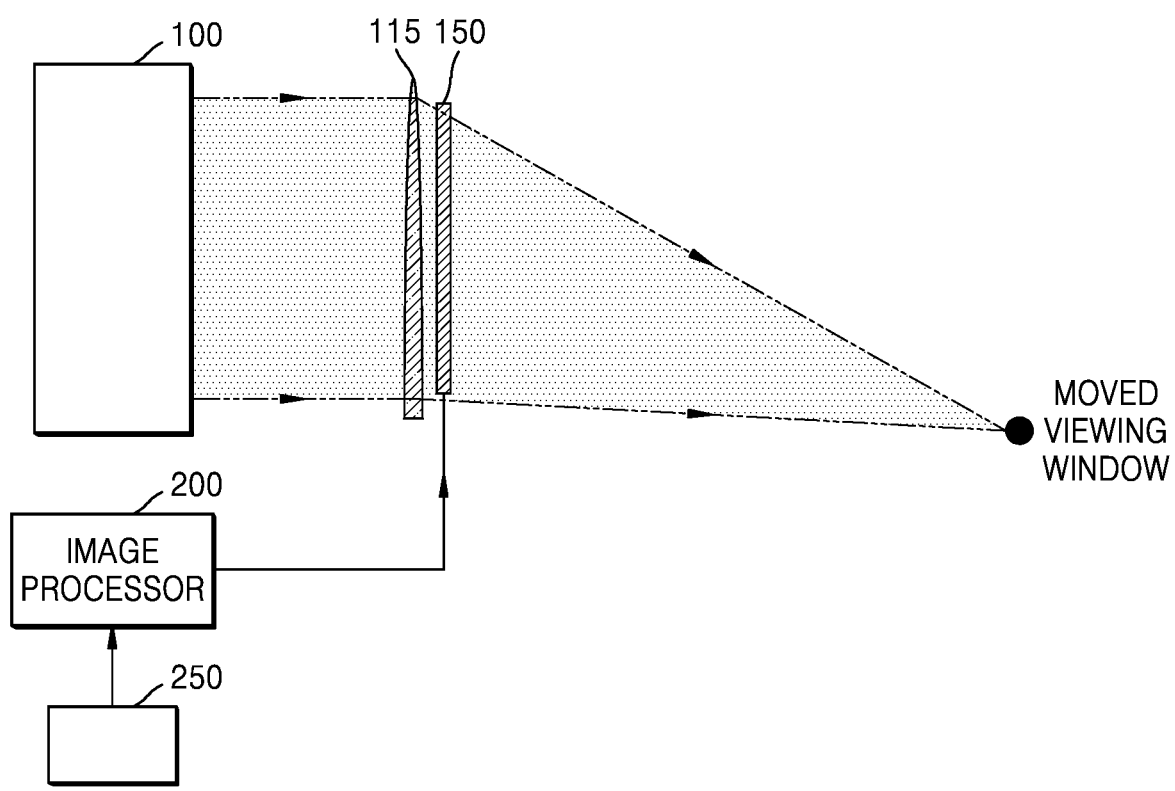
FIG. 4 is a view of a holographic display apparatus according to another embodiment.

FIG. 4 schematically shows a holographic display apparatus according to another embodiment. When FIG. 4 is compared to FIG. 1, there is a difference in that an optical element 115 is made of an off-axis lens itself, for example, an off-axis condensing lens, and is provided to focus an incident beam while bending the incident beam off-axis. When the optical element 115 is made of an off-axis lens structure as shown in FIG. 4, because the optical element 115 may simultaneously function to bend the incident beam and focus the incident beam, a separate condensing lens may be omitted. For example, the optical element 115 may include half or less of a condensing lens, so that form an off-axis condensing lens. Although FIG. 4 shows that the optical element 115 is an off-axis condensing lens in the form of a biconvex refractive lens, which is shown as an example. As the optical element 115, a flat lens serving as an off-axis condensing lens, for example, a GP (geometric phase) lens or the like, may be provided.

Figure 5:
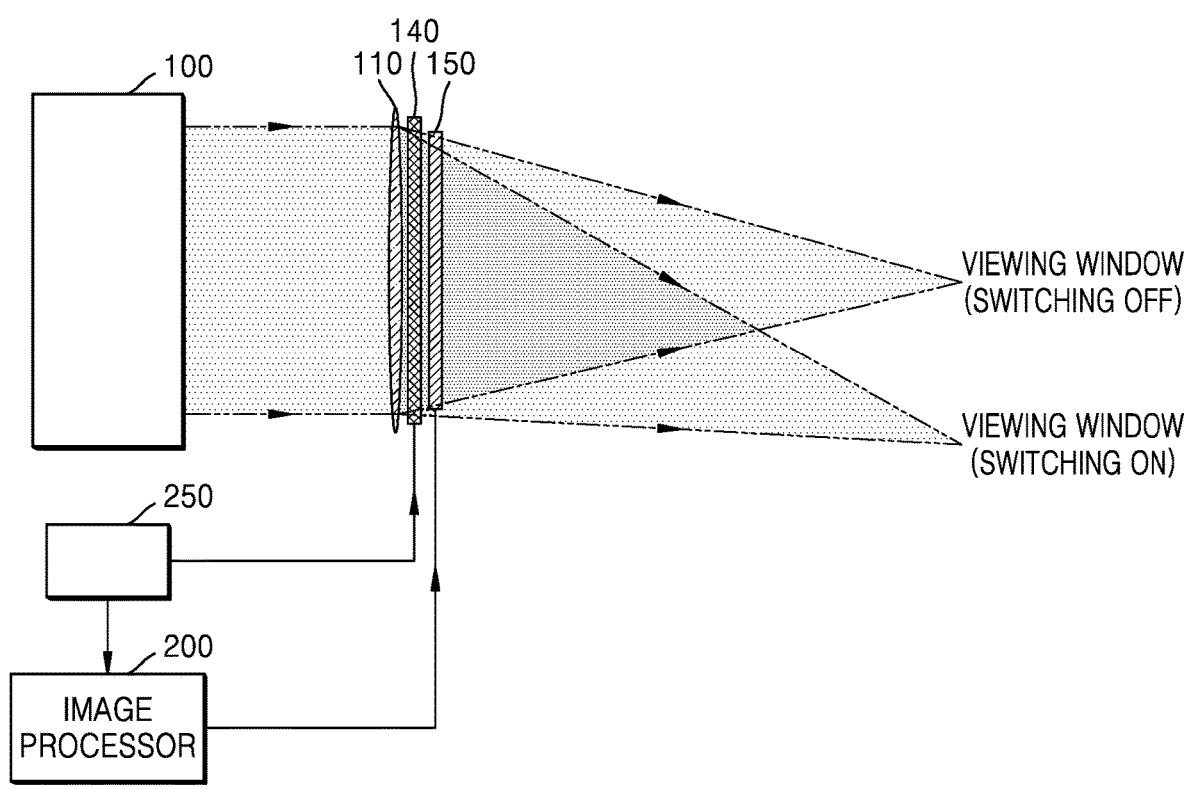
FIG. 5 is a view of a holographic display apparatus according to another embodiment.

FIG. 5 schematically shows a holographic display apparatus according to another embodiment. Compared to FIG. 1, FIG. 5 shows a case in which the optical element 140 is provided to position a viewing window of a hologram image in front of the spatial light modulator 150 or to move the viewing window of the hologram image off-axis by a first angle according to switching on/off. For example, when the optical element 140 for bending an incident beam is switched off, the viewing window of the hologram image may be formed in front of the holographic display apparatus, and when the optical element 140 is switched on, the viewing window of the hologram image may be formed on the side of the holographic display apparatus.

As described above, when the optical element 140 is provided to change the position of forming the viewing window of the hologram image according to the switching on/off, whether to form the viewing window of the hologram image in front or on the side of the holographic display apparatus may be changed according to user convenience.

According to the embodiment, the backlight 100 may further include a polarization rotator that changes polarization according to switching on/off, and as the optical element 140, any one of a polarization grating and a meta-optical element that are switched on/off according to polarization of a reference beam may be provided.

In this way, the backlight 100 further includes a polarization rotator, and the optical element 140 is provided to selectively bend an incident beam according to switching on/off, thereby being driven to be located the viewing window of the hologram image on the side of the holographic display. If necessary, the holographic display apparatus may be driven to be located the viewing window of the hologram image in front of the spatial light modulator 150.

According to the holographic display apparatus according to various embodiments shown in FIGS. 1, 2, 4 and 5, by bending an incident beam by the optical elements 130 and 140, a viewing window of a hologram image formed by the spatial light modulator 150 is moved off-axis by a first angle, for example, by an angle of about 30 degrees or more, so that the hologram image may be viewed from the side. In addition, by selectively bending the incident beam by on/off driving of the optical element 140, the optical element 140 is switched on to move the viewing window of the hologram image formed by the spatial light modulator 150 off-axis by a first angle, for example, by an angle of about 30 degrees or more, so that the hologram image may be viewed from the lateral direction. Also, by switching off the optical element 140, the viewing window of the hologram image is located in front of the spatial light modulator 150, so that the hologram image may be viewed from the front. In this way, the viewing position of the hologram image may be determined according to user convenience.

Meanwhile, the holographic display apparatus according to various embodiments illustrated in FIGS. 1, 2, 4 and 5 may track an observer's pupil position by the eye tracker 250 and may view the hologram image formed by the spatial light modulator 150 in a lateral direction, which is a direction bent by a first angle, for example, by an angle of about 30 degrees or more from the front.

Figure 6:
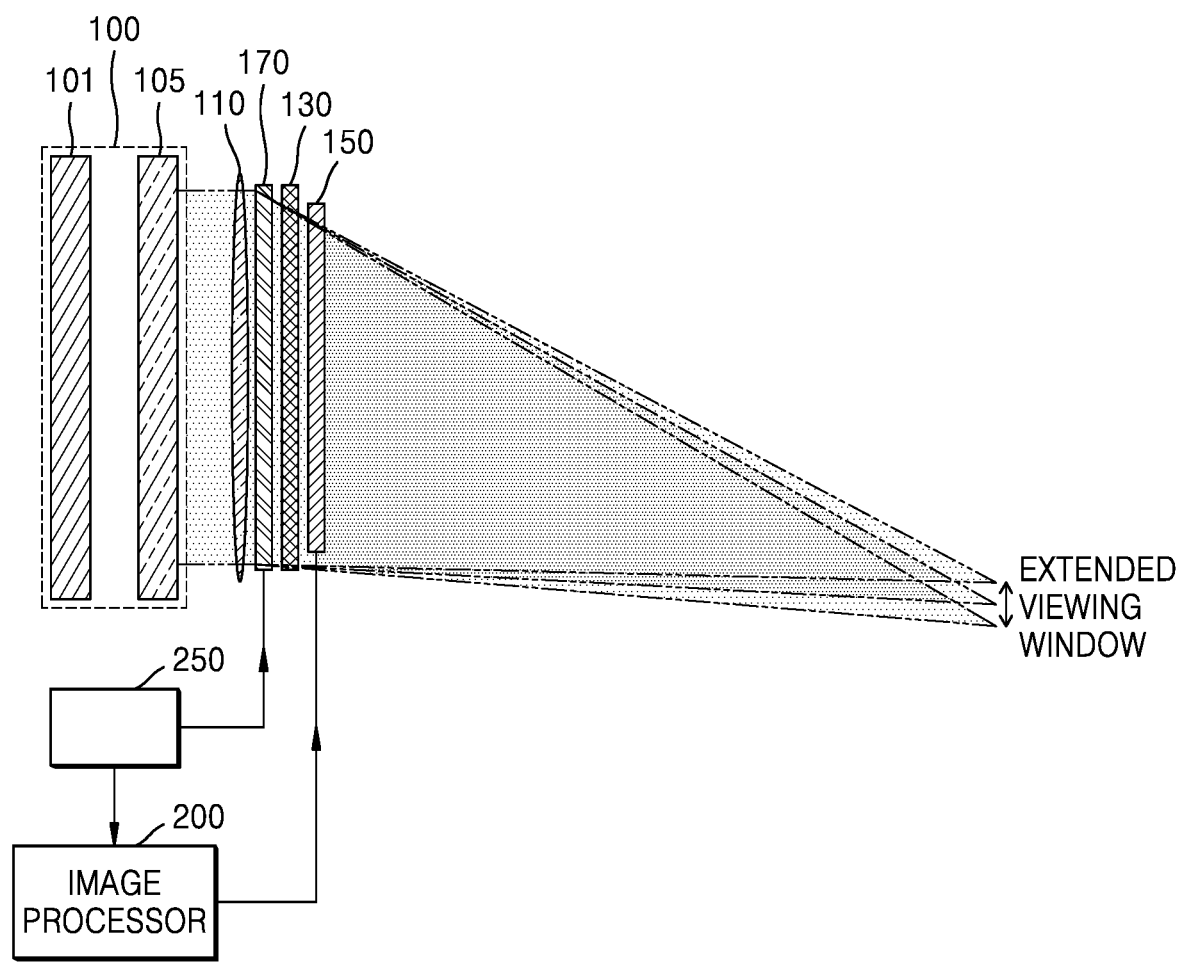
FIGS. 6 to 8 are views of a holographic display apparatus according to various embodiments.
Figure 7:
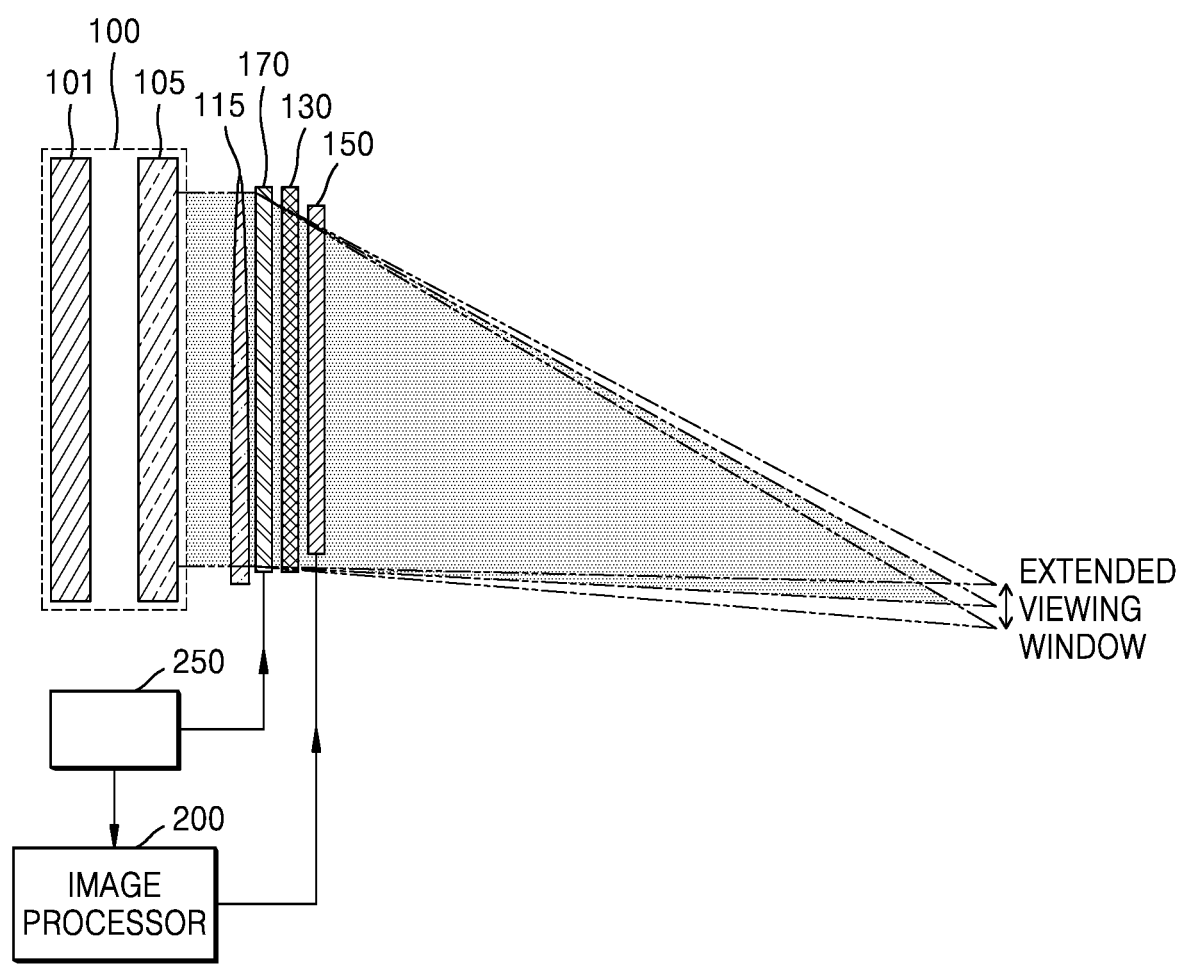
Figure 8:
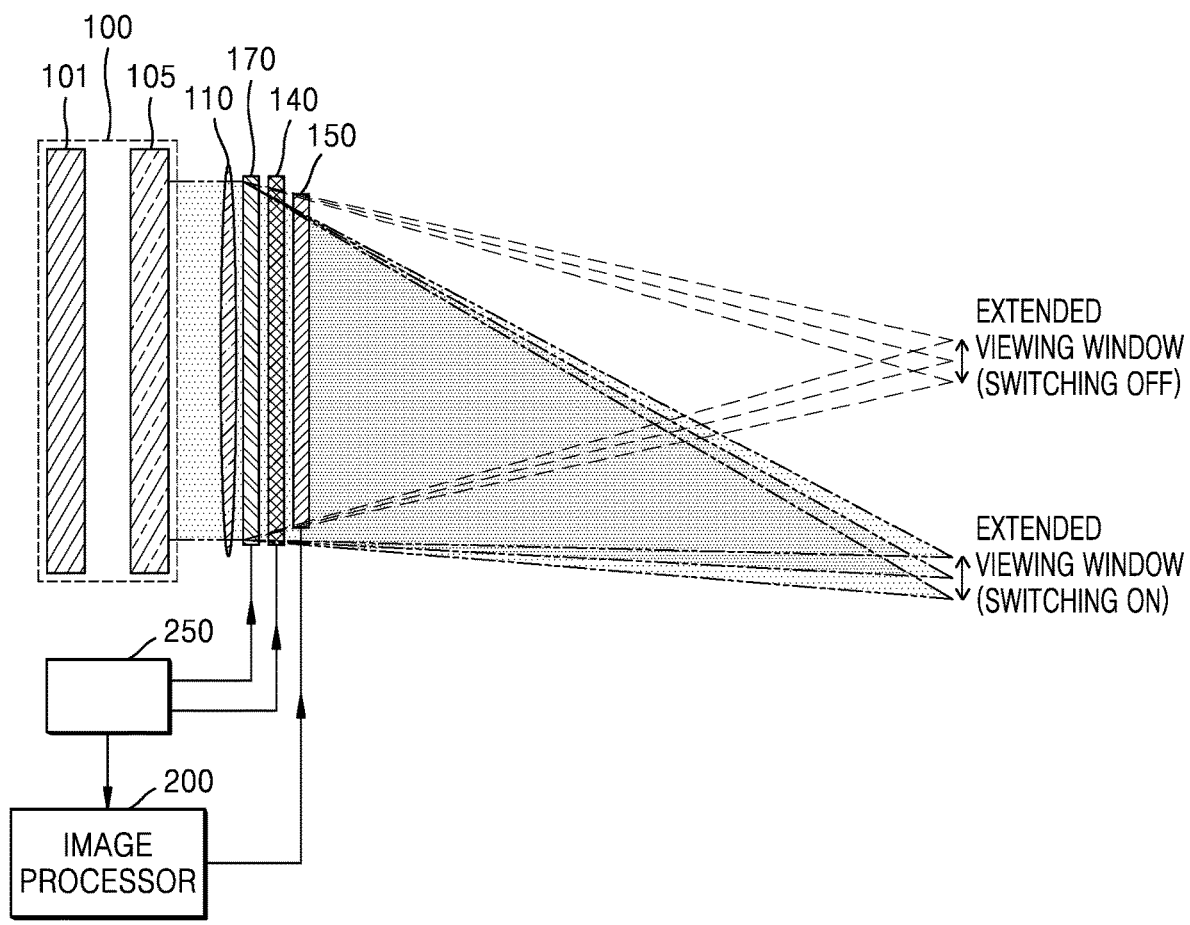

FIGS. 6 to 8 schematically show a holographic display apparatus according to various embodiments. FIGS. 6 to 8 exemplarily show a case in which the backlight 100 includes a light source 101 and a light guide plate 105.

The holographic display apparatus of FIGS. 6 to 8, when compared with FIGS. 1, 4, and 5, respectively, further includes a beam deflector 170 that additionally fine-adjusts the position of a viewing window of a hologram image in the range of a second angle smaller than a first angle at which an incident beam is bent off-axis by the optical element 130. The beam deflector 170 may be implemented as an active element for actively tracking an observer's pupil position in the second angle range that is small angle range.

The holographic display apparatus illustrated in FIG. 6 corresponds to the holographic display apparatus illustrated in FIG. 1, and further includes the beam deflector 170 to provide a more extended viewing window. The holographic display apparatus illustrated in FIG. 7 corresponds to the holographic display apparatus illustrated in FIG. 4, and further includes the beam deflector 170 to provide a more extended viewing window. The holographic display apparatus illustrated in FIG. 8 corresponds to the holographic display apparatus illustrated in FIG. 5, and further includes the beam deflector 170 to provide a more extended viewing window.

At this time, the beam deflector 170 may be provided to fine-adjust the position of the viewing window of the hologram image in the range of the second angle range, for example, an angle of about 10 or less, according to an observer's pupil position sensed by the eye tracker 250. When the beam deflector 170 is further provided as described above, the holographic display apparatus according to the embodiments may form a viewing window from the side, and may provide a more extended viewing window, and thus, since the degree of freedom in a position of viewing the hologram image increases, the convenience of viewing the hologram image may be increased.

On the other hand, according to the holographic display apparatus according to various embodiments shown in FIGS. 1, 2, 4, 5, and 6 to 8, the image processor 200 may generate hologram data according to the position of the viewing window of the hologram image and the hologram image to be reproduced, and may provide the hologram data to the spatial light modulator 150. For example, the optical element 130 is located on the light incident surface of the spatial light modulator 150 and a reference beam enters the spatial light modulator 150 at an angle, and the image processor 200 may generate hologram data with respect to the reference beam incident to the spatial light modulator 150 at an angle and provide the hologram data to the spatial light modulator 150.

As shown in FIGS. 1 and 4, when the optical element 130 bends the incident beam at the first angle being fixed, because the position of the viewing window of the hologram image formed by the spatial light modulator 150 is approximately determined within a range controlled by the spatial light modulator 150, the image processor 200 may generate hologram data according to the position of the viewing window of the hologram image and the hologram image to be reproduced according to the observer's pupil position obtained from the eye tracker 250 and provide the hologram data to the spatial light modulator 150.

As shown in FIG. 5, when the optical element 130 is switched on/off and the incident beam is bent by a first angle or condensed in front of the spatial light modulator 150, because the position of the viewing window of the hologram image formed by the spatial light modulator 150 is determined in front direction or a lateral that is bent by the first angle within a range controlled by the spatial light modulator 150, the image processor 200 may generate hologram data according to the position of the viewing window of the hologram image and the hologram image to be reproduced according to the observer's pupil position obtained from the eye tracker 250 and provide the hologram data to the spatial light modulator 150.

Also, as shown in FIGS. 6 to 8, when the position of the viewing window of the hologram image is further fine-adjusted by the beam deflector 170 in the range of the second angle smaller than the first angle at which an incident beam is bent off-axis by the optical element 130, the image processor 200 may generate hologram data according to the position of the viewing window of the hologram image and the hologram image to be reproduced according to the observer's pupil position obtained from the eye tracker 250 and provide the hologram data to the spatial light modulator 150.

Hereinafter, referring to FIGS. 9, 10, and 11A to 11G, a process of generating hologram data for forming a hologram image that may be viewed from the side by controlling the spatial light modulator 150 in the image processor 200 will be described.

According to a holographic display apparatus according to an embodiment, the hologram data generation in the image processor 200 may be performed based on a depth map method. The depth map method is a method of decomposing a 3D object into a plurality of parallel planes and reproducing each plane at a corresponding depth. Each decomposed plane may be reproduced in its original position to simulate the 3D object. Therefore, when a CGH for a specific plane is calculated, a CGH of the 3D object may be calculated.

Figure 9:
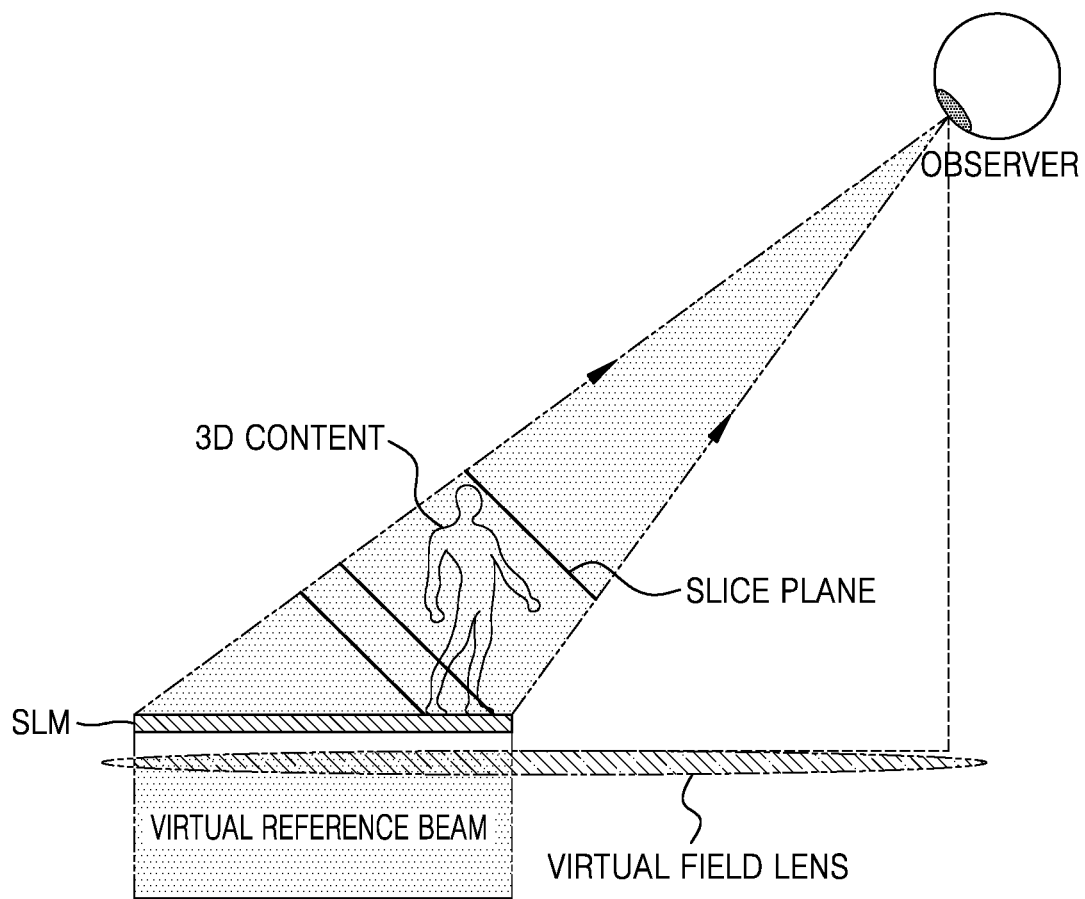
FIG. 9 is a view of an equivalent system of a holographic display apparatus according to various embodiments described with reference to FIGS. 1, 2, 4, 5, 6, 7 and 8.
Figure 10:
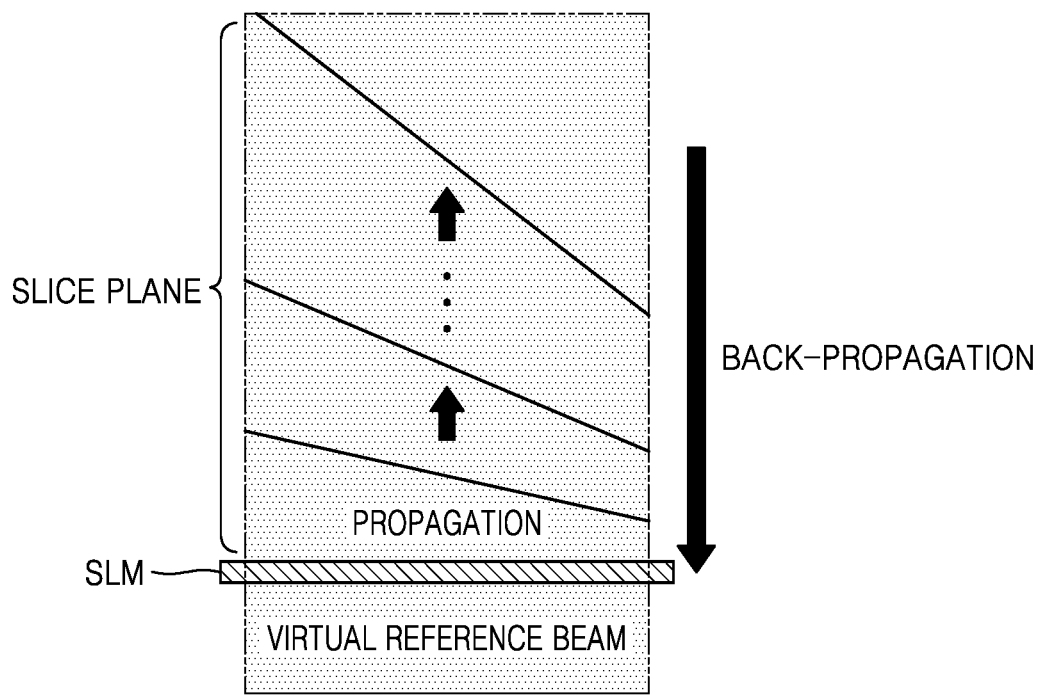
FIG. 10 is a view illustrating a process of generating hologram data for forming a hologram image that may be viewed from the side by controlling a spatial light modulator in an image processor of a holographic display apparatus according to an embodiment.

For example, in order to generate hologram data for controlling the spatial light modulator 150 in the image processor 200 such that the viewing window of the hologram image formed by the spatial light modulator 150 is positioned laterally in the holographic display apparatus according to various embodiments described with reference to FIGS. 1, 2, 4, 5, and 6 to 8, as shown in FIGS. 9 and 10, the holographic display apparatus may perform decomposing 3D content to be reproduced into a plurality of reproduction planes (slice planes), imaging the plurality of reproduction planes with a virtual lens to calculate the position and tilt angle of the imaged planes, and calculating hologram data such as a CGH by back-propagating the imaged planes to the spatial light modulator (SLM) 150.

FIG. 9 shows an equivalent system of the holographic display apparatus according to various embodiments described with reference to FIGS. 1, 2, 4, 5 and 6 to 8. As shown in FIG. 9, instead of the optical element 130, 140, or 115 for bending an incident beam used in an actual device, an off-axis virtual field lens (condensing lens) and a virtual reference beam are assumed to simulate the same situation for a spatial light modulator SLM. For the spatial light modulator SLM that modulates a wavefront of a reference beam to reproduce a hologram, the holographic display apparatus according to the embodiment and the system of FIG. 4 are in an equivalent situation, so a CGH may be calculated for the system of FIG. 4. In order to calculate a hologram for a specific plane for a holographic display apparatus using a virtual field lens and a reference beam as in the system of FIG. 4, a plane to be reproduced may be imaged with a virtual field lens, and a CGH for the imaged plane may be calculated. At this time, because the plane imaged by the virtual field lens is inclined at a specific angle with respect to the spatial light modulator 150, the hologram may be calculated using a wavefront propagation method for the inclined plane.

FIG. 9 exemplarily illustrates a case in which a virtual reference beam is bent by an off-axial virtual field lens, and 3D content of a hologram image formed by the spatial light modulator SLM is made to be viewed by an observer from the side. FIG. 10 shows a summary of the overall process of calculating hologram data, such as a CGH.

FIGS. 11A to 11G show a step-by-step process of calculating hologram data, for example, a CGH, through a process of calculating the position and inclined angle of an imaged plane with respect to a plurality of reproduction planes (slice planes) obtained by decomposing 3D content to be reproduced.

Figure 11A:
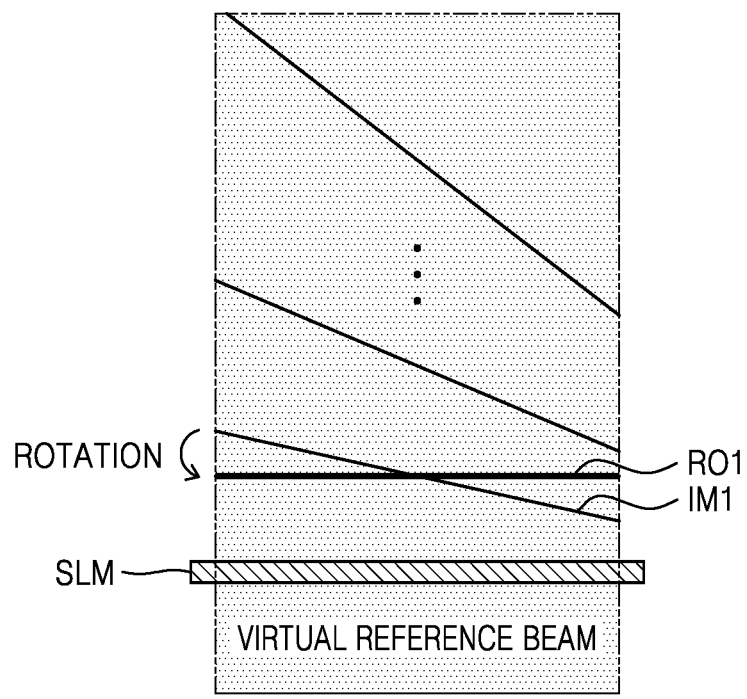
FIGS. 11A to 11G are views of a process of generating hologram data for forming a hologram image that may be viewed from the side by controlling a spatial light modulator in an image processor of a holographic display apparatus according to an embodiment.

First, referring to FIG. 11A, a wavefront of one image plane IM1 is rotation-transformed into a plane parallel to the spatial light modulator SLM to calculate the position and inclined angle of the imaged plane IM1. In FIG. 11A, reference numeral RO1 denotes a rotated plane in which one image plane IM1 is rotated.

Figure 11B:
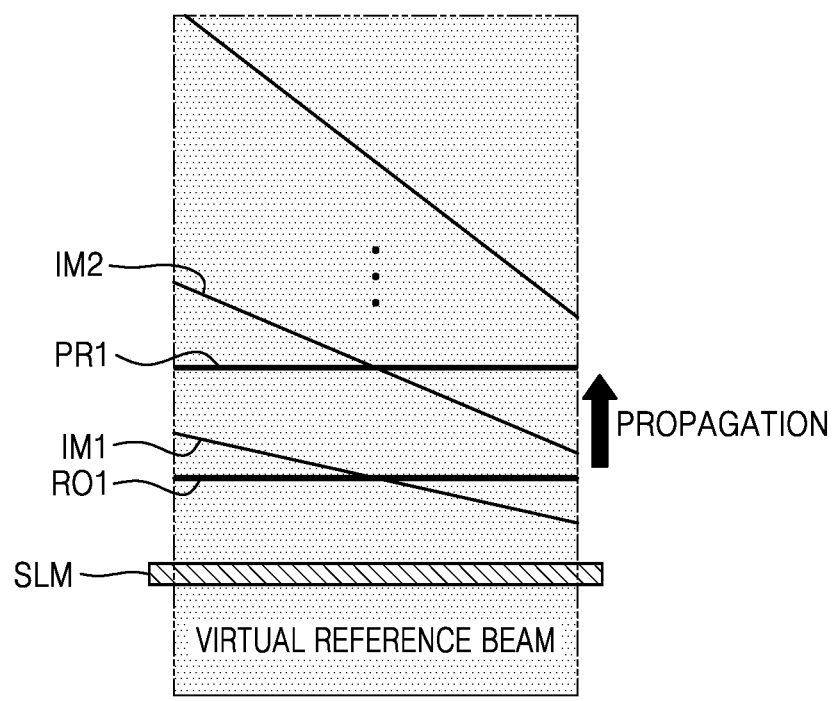
Figure 11C:
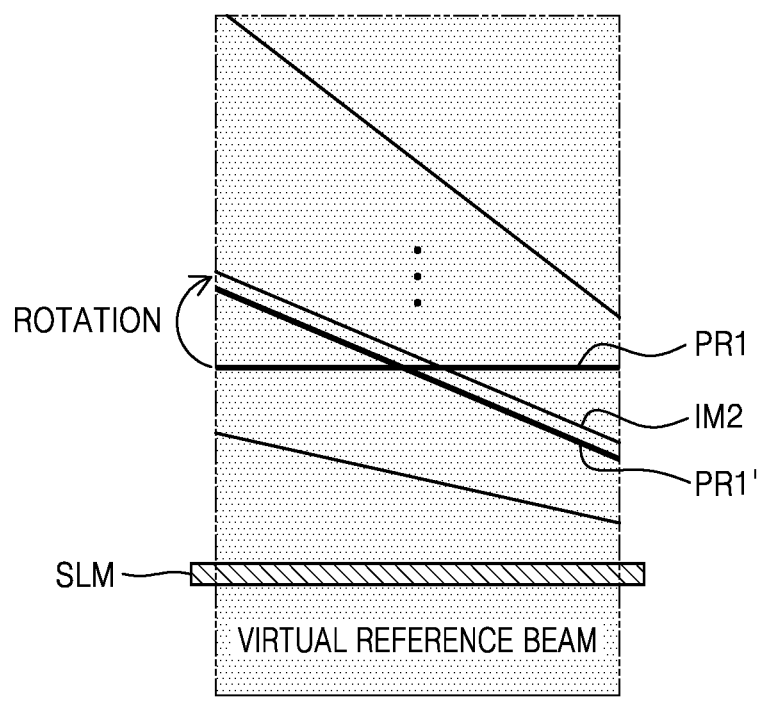

Next, referring to FIGS. 11B and 11C, the rotated plane RO1 rotation-transformed may be propagated to the center of the next image plane IM2, and may be rotation-transformed to be parallel to the next image plane IM2. In FIG. 11B, the reference numeral PR1 denotes a propagation plane where the rotation plane RO1 is propagated. In FIG. 11C, reference numeral PR1' denotes a rotation conversion plane obtained by rotation-transforming the propagation plane PR1.

Figure 11D:
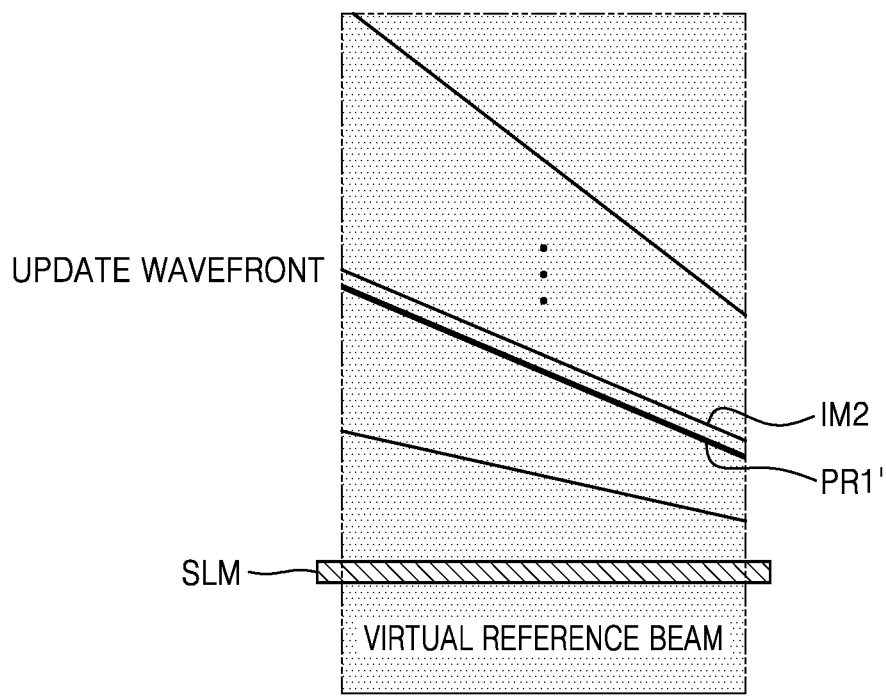

Next, referring to FIG. 11D, the next image plane IM2 is replaced with the rotation conversion plane PR1' of the propagation plane PR1.

Figure 11E:
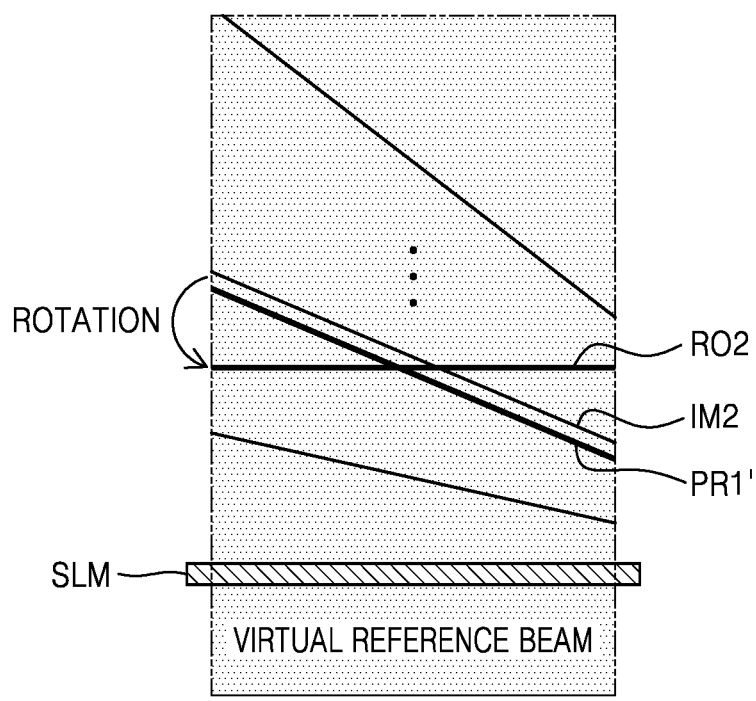

Next, referring to FIG. 11E, in order to propagate to the next plane, a wavefront of the next image plane IM2 may be rotation-transformed in parallel with the spatial light modulator SLM. In FIG. 11E, reference numeral RO2 represents a rotation plane in which the image plane IM2 is rotated in parallel with the spatial light modulator SLM after being replaced with the rotation conversion plane PR1' of the propagation plane PR1.

Figure 11F:
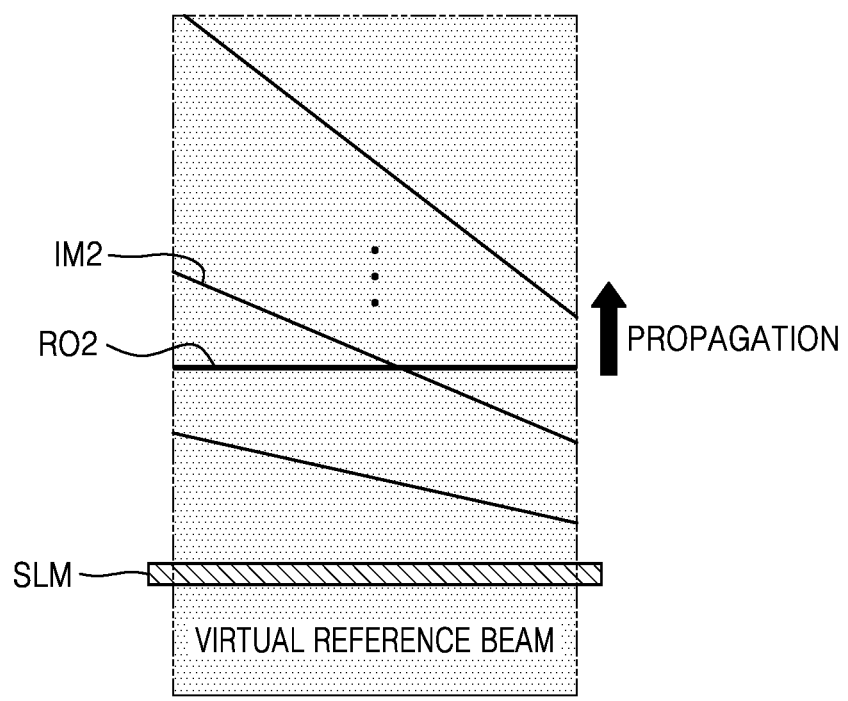

Referring to FIG. 11F, rotation conversion and propagation process may be repeated until the last plane is reached.

Figure 11G:
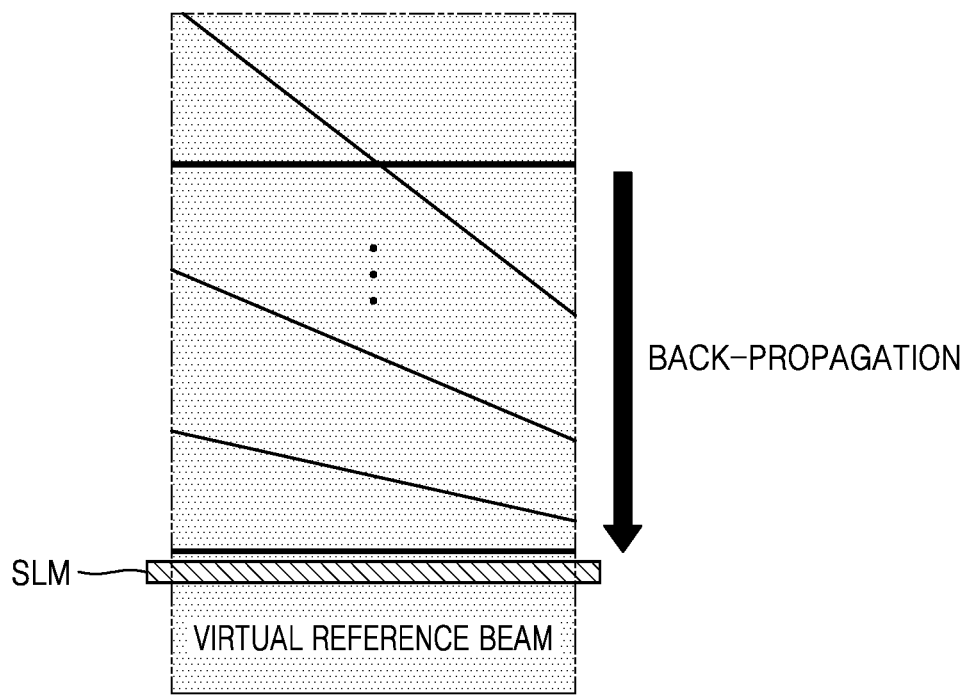

Next, referring to FIG. 11G, when the last plane is reached, a CGH is calculated by back-propagating the rotated planes with the spatial light modulator SLM to generate hologram data.

When a wavefront of a reference beam is modulated in the spatial light modulator 150 of the holographic display apparatus according to the embodiment by the hologram data generated as described above, a hologram image may be viewed from the side.

According to the holographic display according to the above various embodiments, it is possible to watch a hologram image from the side of the holographic display by applying the optical element 130, 140, or 115 that bend an incident beam. In addition, by providing the optical element 140 to be selectively driven, it is possible to implement a holographic display apparatus that allows hologram images to be viewed not only from the side of the holographic display, but also from in front of the holographic display.

According to the holographic display according to the embodiment, it is possible to watch a hologram image from the side of the holographic display by applying an optical element that bends an incident beam. In addition, by providing the optical element to be selectively driven, it is possible to implement a holographic display apparatus that allows hologram images to be viewed not only from the side of the holographic display, but also in front of the holographic display.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
a spatial light modulator configured to modulate a wavefront of a reference beam to form a hologram image;
an optical element arranged to bend an incident beam onto at least one of a light incident surface and a light exit surface of the spatial light modulator to change a position of a viewing window of the hologram image off-axis by a first angle; and
an image processor configured to generate hologram data according to the position of the viewing window of the hologram image and a hologram image to be reproduced, and provide the hologram data to the spatial light modulator,
wherein the hologram image formed by the spatial light modulator is viewable from a side of the spatial light modulator.

2. The holographic display apparatus of claim 1, further comprising a condensing lens configured to focus the reference beam on to the spatial light modulator.

3. The holographic display apparatus of claim 2, wherein the optical element comprises a diffractive optical element.

4. The holographic display apparatus of claim 2, wherein the optical element is located in front of the condensing lens, between the condensing lens and the spatial light modulator, or behind the spatial light modulator.

5. The holographic display apparatus of claim 2, wherein the optical element is configured to selectively switch between positioning the viewing window of the hologram image in front of the spatial light modulator or moving the viewing window of the hologram image off-axis by the first angle.

6. The holographic display apparatus of claim 5, wherein the optical element comprises one of a polarization grating or a meta-optical element, which are selectively switchable based on the polarization of the reference beam.

7. The holographic display apparatus of claim 5, wherein the optical element is located in front of the condensing lens, between the condensing lens and the spatial light modulator, or behind the spatial light modulator.

8. The holographic display apparatus of claim 2, wherein the optical element is located in front of the condensing lens, between the condensing lens and the spatial light modulator, or behind the spatial light modulator.

9. The holographic display apparatus of claim 1, wherein the optical element comprises an off-axis lens configured to focus and bend the reference beam.

10. The holographic display apparatus of claim 1, wherein the first angle is about 30 degrees or more.

11. The holographic display apparatus of claim 10, further comprising a beam deflector configured to that fine-adjust the position of the viewing window of the hologram image in the range of a second angle smaller than the first angle.

12. The holographic display apparatus of claim 11, wherein the second angle is about 10 degrees or less.

13. The holographic display apparatus of claim 1, further comprising a beam deflector configured to that fine-adjust the position of the viewing window of the hologram image in the range of a second angle smaller than the first angle.

14. The holographic display apparatus of claim 13, wherein the first angle is about 30 degrees or more, and the second angle is about 10 degrees or less.

15. The holographic display apparatus of claim 1, wherein the optical element is located on a light incident surface of the spatial light modulator, and
the image processor is further configured to provide hologram data to the spatial light modulator for a reference beam incident to the spatial light modulator at an angle.

16. The holographic display apparatus of claim 15, wherein the first angle is about 30 degrees or more.

17. The holographic display apparatus of claim 15, further comprising a beam deflector configured to that fine-adjust the position of the viewing window of the hologram image in the range of a second angle smaller than the first angle,
wherein the first angle is about 30 degrees or more, and the second angle is about 10 degrees or less.

18. The holographic display apparatus of claim 1, wherein the image processor is further configured to generate the hologram data by: decomposing into a plurality of reproduction planes;
imaging of the plurality of reproduction planes with a virtual lens to calculate a position and inclined angle of the imaged planes; and
calculation of a computer-generated hologram (CGH) by propagating the imaged planes to the spatial light modulator.

19. The holographic display apparatus of claim 18, wherein the image processor is further configured to calculate the position and the inclined angle of the imaged planes by:
rotation-transforming a wavefront of one image plane into a plane parallel to the spatial light modulator;
propagating the rotation-transformed plane to a center of a first next plane;
rotation-transforming the wavefront such that the propagated plane is parallel to the first next plane;
replacing the rotation-transformed plane with the first next plane;
rotation-transforming a wavefront of the first next plane in parallel with the spatial light modulator to propagate to a second next plane, and repeating the rotation-transforming and propagating until a last plane is reached, and
generating hologram data by calculating the CGH by back-propagating the last plane to the spatial light modulator when reaching the last plane.

20. A holographic display apparatus comprising:
a spatial light modulator configured to modulate a wavefront of a reference beam to form a hologram image;
an optical element arranged to change a position of a viewing window of the hologram image off-axis by a first angle; and
an image processor configured to generate hologram data according to the position of the viewing window of the hologram image and a hologram image to be reproduced, and provide the hologram data to the spatial light modulator,
wherein the hologram image formed by the spatial light modulator is viewable from a side of the spatial light modulator.

* * * * *